# 2,875,224

PREPARATION OF ORGANIC COMPOUNDS OF TRIVALENT PHOSPHORUS

John L. Van Winkle, San Lorenzo, and Charles S. Bell and Rupert C. Morris, Berkeley, Calif., assignors to Shell Development Company, New York, N. Y., a corporation of Delaware No Drawing. Application June 20, 1957
Serial No. 667,024

9 Claims. (Cl. 260—448)

This invention relates to a new, highly efficient method for preparing useful organo-phorus compounds in which the phosphorus is present in the trivalent state: certain of the products of this method also are new and of particular value.

Aliphatic phosphonous dihalides—that is, compounds of the formula RPXX', wherein R represents an aliphatic group and X and X' each represents a halogen atom other than fluorine—are of substantial interest in the field of organo-phosphorus chemistry. These compounds are capable of many of the addition reactions characteristic of trivalent phosphorus compounds and, in addition, being essentially acid halides, are capable of many replacement reactions that involve the highly reactive halogen atoms attached to the phosphorus atom. The subgenus of these compounds in which the group R is a halogenated alkyl group, particularly such groups wherein the carbon atom directly linked to the phosphorus atom is also linked to at least one halogen atom, are of particular interest, inasmuch as they may be converted to various derivatives which exhibit high activity as extreme pressure agents in lubricating oil compositions.

However, no method of broad application for preparing these aliphatic phosphonous dihalides has been available heretofore. The known methods have proven to be either cumbersom, or of limited applicability, or both. See, for example, chapter 3 of Kosolapoff, "Organophosphorus Compounds," Wiley, 1950, wherein the prior art methods for the preparation of phosphonous dihalides, therein designated as halophosphines, are described.

We now have discovered that aliphatic phosphonous dihalides can be prepared easily and in excellent yields by preparing a ternary complex of an aliphatic halide, a trihalide of phosphorus and a trihalide of aluminum, reacting that complex with elemental phosphorus, and reacting the resulting product with an aliphatic halide and a trihalide of phosphorus, and recovering an aliphatic phosphonous dihalide from the reaction mixture.

The primary reactions involved in this process appear to be:

(a) $RX + PX_3 + AlX_3 = [RPX_3]^+ \cdot [AlX_4]^-$
(b) $3[RPX_3]^+ \cdot [AlX_4]^- + 2P$
$\quad = 3[RPX] + \cdot [AlX_4]^- + 2PX_3$
(c) $[RPX]^+ \cdot [AlX_4]^- + PX_3 + RX$
$\quad = RPX_2 + [RPX_3]^+ \cdot [AlX_4]^-$ In these equations, R represents an aliphatic group and X represents a halogen atom.

It will be noted that in the reaction of the ternary complex with phosphorus, the products are a complex of an aliphatic phosphonous dihalide with a trihalide of aluminum, and a phosphorous trihalide. This reaction provides one of the reactants for the subsequent reaction of the phosphonous dihalide-aluminum trihalide complex with the aliphatic dihalide and the phosphorous trihalide. It will also be noted that the final products of this process are the phosphonous dihalide and the ternary complex used as the original starting material. These two products have quite different solubility characteristics, so that they may be separated easily, yielding directly the desired product, and a direct source of the ternary complex, containing the aluminum trihalide, for further preparation of the desired phosphonous dihalides. The new process avoids separation and recovery of the aluminum trihalide, normally a laborious and costly step practiced only because the aluminum trihalide is an expensive reagent. In practice, it has been found that excellent yields of the phosphonous dihalide and the ternary complex are obtained; there occurs but a small loss of the aliphatic halide, phosphorous trihalide and aluminum trihalide to undesirable side reactions. Our discovery thus provides a practical, highly efficient method for preparing aliphatic phosphonous dihalides, admirably suited to continuous operation.

According to our new process, the starting material for the preparation of an aliphatic phosphonous dihalide is a ternary complex of an aliphatic halide, a phosphorous trihalide and an aluminum trihalide. These ternary complexes have the general formula:

$$[RPX_3]^+ \cdot [AlX_4]^-$$

wherein R represents an aliphatic group, including the straight-chain and branched-chain alkyl groups, cycloalkyl groups and aralkyl groups, and these aliphatic groups substituted by one or more halogen atoms or other chemically inert (as regards the reactants used in the new process under the conditions employed therein) substituent group or groups, and X represents a halogen atom other than the fluorine atom, with the proviso that each X may be the same or a different halogen atom. While each X represents a bromine, chlorine or iodine atom, it is preferred that X represent a middle halogen—that is, a bromine atom or a chlorine atom. It is also preferred that all of the symbols X represent the same halogen, since in such case, the number of different radicals involved is at a minimum. Suitable ternary complexes thus include those wherein R represents an alkyl group, such as a lower alkyl group—i. e., an alkyl group containing up to about 10 carbon atoms—and including the normal, branched-chain and cycloalkyl groups of this class, examples of these groups including, but not being restricted to, the methyl, ethyl, n- and isopropyl groups, n-, iso- and sec-butyl groups, the pentyl, hexyl, nonyl and octyl groups, both of straight-chain and branched-chain configuration, the cyclopropyl, cyclobutyl, cyclopentyl, cyclohexyl and cyclooctyl groups, and the alkyl-substituted cycloalkyl groups, such as the 4-methylcyclohexyl group, the 3,3,5-trimethylcyclohexyl group, and the like. Suitable ternary complexes also include those wherein R represents an aralipatic group, such as the phenylethyl group, and the like. Also suitable are the ternary complexes in which the aliphatic group represented by R is an olefinically unsaturated group, such as the lower alkenyl groups, the lower alkadienyl groups, the cycloalkenyl groups, cycloalkadienyl groups, and the like, including the vinyl, allyl, crotyl and pentenyl groups, the butadienyl and heptadienyl groups, the cyclopentenyl and cyclohexenyl groups, the cyclopentadienyl and cyclohexadienyl groups, and the like. It is preferred that the aliphatic group represented by R contain not more than about 20 carbon atoms, and even more preferably that the group R contain not more than about 10 carbon atoms. Ternary complexes in which R represents a substituted aliphatic group selected from the above-mentioned classes also are suitable, provided that the substituent group or groups is (are) not reactive under the conditions required by the process of the invention. The ternary complexes in which R represents a halogen-substituted aliphatic group, particularly halogen-substituted aliphatic groups in which at least one of the hydrogen atoms of the alpha carbon atom thereof, relative to the phosphorus atom, has been replaced by a halogen atom, are particularly of interest because the phosphonous dihalides which are prepared from these complexes by the process of the invention are valuable source materials for the preparation of comopunds which impact excellent extreme pressure characteristics to lubricating compositions in which they are present.

The suitable ternary complexes are, of course, prepared from the corresponding aliphatic halides RX, wherein R is an aliphatic group as hereinbefore defined and illustrated, and X represents a halogen atom, preferably a middle halogen atom such as a bromine or a chlorine atom.

These ternary complexes, and methods for preparing them, are known in the art. See, for example, British patent specification No. 707,961, issued April 28, 1954, and the article by Kinnear and Perren, in the Journal of the Chemical Society, 1952, pages 3437–3445. A method for preparing perhalocarbon ternary complexes, and also suitable for preparing ternary complexes of alpha-halogeno-aliphatic halides generally, is disclosed in detail in United States Patent No. 2,768,960. The pertinent disclosures of these references and this patent are hereby incorporated into and made a part of this description of our new process.

According to our discovery, the ternary complex is reacted with elemental phosphorus to reduce the phosphorus atom of the complex from the pentavalent to the trivalent state. The products of this reaction are a binary complex of the aliphatic phosphonous dihalide with the aluminum trihalide, of the formula:

$$[RPX]^+ \cdot [AlX_4]^-$$

and a phosphorous trihalide, $PX_3$, wherein the symbols R and X have the respective meanings hereinbefore set out.

The binary complexes of this class wherein R represents an alpha-haloalkyl group and including the perhaloalkyl groups are of particular interest by reason of their importance in the preparation of compounds useful as extreme pressure additives for lubricating compositions. This subgenus of the phosphonous dihalide-aluminum trihalide complexes are believed to be novel.

The reaction of the ternary complex with the elemental phosphorus is conducted by merely heating the complex and the phosphorus together, molecular oxygen and water being rigorously excluded from the reaction zone. Preferably the reaction is carried out in the presence of a suitable inert solvent or diluent. In some cases, the presence of very small amounts of elemental iodine, as catalyst, may be desirable.

Either white or red phosphorus may be used, white phosphorus being preferred because the reaction of the ternary complex with the phosphorus can be carried out at substantially lower temperatures where white phosphorus is used than where red phosphorus is used. When white phosphorus is used, the reaction conveniently is carried out at any temperature above the melting point of white phosphorus, which is 44° C. While temperatures somewhat below this level, for example, ordinary room temperature, may be used, such temperatures involve handling of solid phosphorus; this procedure is inconvenient and therefore is desirably avoided. Also, while substantially elevated temperatures may be used, little additional advantage over lower temperatures results from the use of temperatures in excess of about 150° C. Temperatures in the range of from about 50° C. to about 150° C. accordingly are preferred when white phosphorus is used. When red phosphorus is used, higher reaction temperatures ordinarily are required. Temperatures in the range of from about 150° C. to about 300° C. normally are most satisfactory, temperatures of from about 175° C. to about 225° C. being preferred.

When red phosphorus is used, it often will be found desirable to provide a catalytic amount of elemental iodine in the reaction mixture. The amount of such added iodine need not exceed about 1% of the weight of the ternary complex, and in the usual case from about 0.001% to about 0.25% by weight of iodine, based on the weight of the complex will be sufficient.

Substantially stoichiometric amounts of the ternary complex and the elemental phosphorus normally are employed—that is, substantially two-thirds of a gram-atom of phosphorus is charged per gram-mole of the ternary complex. In some cases, it may be found desirable that somewhat different ratios of the reactants be used, but in the great majority of cases, it will be found desirable to charge at least 0.75 gram-atom of phosphorus per gram-mole of the ternary complex. Also, in the great majority of cases, it will be found that little additional advantage, as compared to lesser amounts, accrues from the use of more than about two gram-atoms of phosphorus per gram-mole of ternary complex; usually, it will be found preferable to employ from about 0.8 to about 1.5 gram-atoms of phosphorus per gram-mole of complex.

To permit better control over the reaction, it is preferred that the reaction of the ternary complex and the elemental phosphorus be carried out in the presence of an inert organic diluent, preferably one which is a solvent for the reactants. The presence of such a diluent or solvent aids in contacting the reactants and also moderates the reaction. The amount of diluent used is not critical. Sufficient should be used to dissolve or disperse the reactants and to provide a readily fluid reaction mixture. Suitable diluents (which term also includes solvents) include the normally liquid hydrocarbons, including the liquid alkanes, the normally liquid aromatic hydrocarbons such as benzene, toluene, xylene and the like, the normally liquid halogenated hydrocarbons, including the halogenated alkanes such as carbon tetrachloride, methylene chloride, ethyl chloride and the like, and normally liquid halogenated aromatic hydrocarbons, including chloro- and dichloro-benzene, and the like. Also suitable are the phosphorus trihalides. These latter compounds are preferred, because they are eminently suitable diluents, and use of these compound reduces the number of compounds present in the reaction zone, and avoids a recovery step which would be required if some other material were to be used as solvent. Obviously, for the same reasons, it is still more preferable that that phosphorous trihalide used as the diluent be the same phosphorous trihalide used in preparation of the ternary complex. Also, use of a phosphorous trihalide as diluent leads to substantial advantage in recovery of the phosphorous trihalide from the reduced complex. This aspect of the process of this invention will be discussed in detail hereinafter. Also, and for the same reason, it often will be found advantageous to employ a mixture of a phosporous trihalide and an aliphatic halide as diluent.

Molecular oxygen must be rigorously excluded from the reaction zone. This may be accomplished, as may be convenient, by operating in a liquid-full reaction zone, or by operating in the presence of an inert atmosphere. Suitable as the inert atmosphere is any gas inert in the reaction zone, such commonly available materials as carbon dioxide and nitrogen being preferred.

Water also must be rigorously excluded from the reaction zone.

The reaction of the ternary complex with the phosphorus is carried out by mixing the reactants and heating the mixture as necessary to complete the reaction. The order in which the reactants is mixed is ordinarily unimportant. In the preferred practice of the new process, the ternary complex is charged to a suitable reaction vessel, a phosphorous trihalide is added as solvent and diluent, the mixture is heated to at least about 44° C. (the melting point of white phosphorus) and while the mixture is continuously stirred, the phosphorus is slowly added. (The phosphorus may be melted and then introduced into the reactor, or it may be introduced as small chunks of the solid phosphorus.) Preferably, after all of the phosphorus has been added, the stirred reaction mixture is heated for an additional period of time to insure completion of the reaction.

The reaction may be carried out at any suitable pressure. However, while either superatmospheric or subatmospheric pressures may be used, it normally will be found most convenient to conduct the reaction at substantially atmospheric pressure.

While the mixing of the reactants and completion of the reaction may be effected in as little as one-half hour, usually it will be found desirable to effect the mixing of the reactants over a period of from about one to about 4 hours, and heat the reaction mixture for from about one to about four hours after mixing of the reactants is complete in order to insure complete reaction. In some cases, it will be found desirable to extend the mixing time to up to as much as eight or ten hours; however, cases where such extended periods of mixing and/or additional heating are necessary or desirable will be found to be the exception, rather than the rule.

The aliphatic phosphonous dihalide is recovered from the complex of the aluminum trihalide therewith by reacting the complex with an aliphatic halide and a phosphorous trihalide, and separating the phosphonous dihalide from the resulting reaction mixture.

The reaction involved in the recovery of the aliphatic phosphonous dihalide in this manner is:

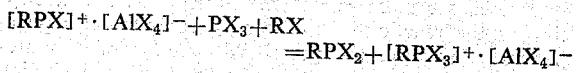

$$[RPX]^+ \cdot [AlX_4]^- + PX_3 + RX$$
$$= RPX_2 + [RPX_3]^+ \cdot [AlX_4]^-$$

wherein R and X have the respective meanings already set out herein. That is to say, the aluminum trihalide in the binary complex reacts with the aliphatic halide, RX, and the phosphorous trihalide, $PX_3$, to form the corresponding ternary complex, and to free the aliphatic phosphonous dihalide, $RPX_2$.

Any of the aliphatic halides and any of the phosphorous trihalides suitable in the preparation of the ternary complex, as set out hereinbefore, may be used to free the aliphatic phosphonous dihalide. It is evident, however, that substantial advantage accrues if the phosphorous trihalide and aliphatic halide used are the same phosphorous trihalide and aliphatic halide used to prepare the ternary complex from which the phosphonous dihalide-aluminum trihalide complex was prepared. By using the same aliphatic halide and phosphorous trihalide, (a) the number of compounds present in the reaction zone is minimzed, thus greatly simplifying recovery of the desired product and minimizing undesirable side reactions, (b) the ternary complex obtained as product is that which is used in the preparation of further amounts of the phosphonous dihalide according to the process of this invention.

The amount of the phosphorous trihalide used preferably is at least about the amount that is theoretically required to react with all of the aluminum trihalide in the binary complex to form the corresponding ternary complex; thus, preferably at least one mole of phosphorous trihalide is charged per mole of the binary complex. Larger amounts of the phosphorous trihalide do not adversely affect the desired reaction, and, as will be pointed out hereinafter, substantial excesses—up to ten times the theoretical minimum—of the phosphorous trihalide are used to substantial advantage.

The amount of the aliphatic halide likewise preferably is at least about the minimum required to react with the phosphorous trihalide and the aluminum trihalide in the binary complex: that is, at least one mole of the aliphatic halide should be charged per mole of the binary complex. Also, substantial excesses of the aliphatic halide do not adversely affect the desired reaction, and as will also be pointed out hereinafter, substantial excesses—up to ten times the theoretical minimum, or even more—of the aliphatic halide may be used to substantial advantage.

The binary complex used may be the purified product from the reduction of the ternary complex, recovered by distillation, extraction or other means, from the ternary complex—phosphorus reaction mixture, and purified by the usual means. However, where a phosphorous trihalide (alone or in admixture with an aliphatic halide) has been used as diluent in the preparation of the binary complex, the crude reaction mixture—the mixture of binary complex, phosphorous trihalide and, if used, aliphatic halide—may be used as the source of the binary complex. Of course, here again it is desirable that the phosphorous trihalide and aliphatic halide, if used, as diluent are the same as the phosphorous trihalide and used to free the phosphonous dihalide from the binary complex. In such a case, of course, the amount of phosphorous trihalide including the amount formed in the course of the reaction of the ternary complex and phosphorus and aliphatic halide must be taken into account when determining the amount of these compounds to be charged, relative to the amount of binary complex to be reacted.

It is preferred that the reaction of the binary complex, aliphatic halide and phosphorous trihalide be carried out in the presence of a diluent that is substantially inert with respect to the components of the final reaction mixture under the conidtions employed. It is preferred that the diluent used be a solvent for the product aliphatic phosphonous dihalide, and that it not be a solvent for the product ternary complex, or vice versa, as this property will permit easy separation of these products. Suitable as the diluent is any of the materials used as the diluent in the preparation of the binary complex. In the preferred practice of the process of this invention, the solvent used is either or both of the phosphorous trihalide and the aliphatic halide used to react with the binary complex; both of these compounds, and mixtures thereof, possess the particularly desirable property that the ternary complex is substantially insoluble therein, while the aliphatic phosphonous dihalide is substantially completely soluble therein, and the boiling points of these compounds, and the product dihalide, respectively, are so different that separation of these compounds and the product dihalide each from the others is easily effected, as by fractional distillation. The final reaction mixture in such a case is easily resolved: the solid ternary complex is removed therefrom by filtration, or decantation, and the phosphorous trihalide, aliphatic halide and aliphatic phosphonous dihalide are separated by fractional distillation of the liquid phase. The amount of the diluent used is not critical; a substantial excess sufficient to completely dissolve the product dihalide and to provide a readily fluid liquid phase is used. Where the aliphatic halide is used as the diluent, sufficient is used to react with the phosphorous trihalide and the aluminum trihalide in the binary complex, and to provide the necessary fluid solution of the product phophonous dihalide. Similarly, when the phosphorous trihalide is used as the diluent, sufficient is provided to react with the aliphatic halide and the aluminum trihalide in the binary complex and to provide the necessary fluid solution of the product phosphonous dihalide. The same considerations apply when mixtures of the phosphorous trihalide and the aliphatic halide are used as the diluent. In the preferred practice, only a moderate excess of phosphorous trihalide over the amount required to react with the binary complex is used, while there is used a large excess of aliphatic halide over the amount required to react with the binary complex. The aliphatic halide in this case comprises the major component of the diluent. Mixtures of phosphorous trihalides and aliphatic halides such as these ordinarily are excellent solvents for aliphatic phosphorous dihalides and are very poor solvents for the ternary complexes. These solubility relationships are ideally suited to separation of the complex and the product dihalide.

The reaction between the binary complex, the aliphatic halide and the phosphorous trihalide is carried out by heating a mixture of the three compounds at about the same temperatures set out hereinbefore for conducting the reaction of the ternary complex with elemental phosphorus, for a sufficient period of time to insure complete reaction. The reactants may be mixed in any convenient sequence. The reaction may be carried out at any pressure, but operation at about atmospheric pressure is quite feasible and normally is preferred because of its convenience. As in the case of the reaction of the ternary complex with elemental phosphorus, water and molecular oxygen must both be rigorously excluded from the reaction zone.

Recovery of the product ternary complex and the product phosphonous dihalide is effected by means known in the art—as by selective extraction, distillation, crystallization or the like. In the preferred practice of the invention, wherein the aliphatic halide, phosphorous trihalide or a mixture of these two compounds is used as the diluent, the ternary complex is recovered by simple phase separation of the solid complex from the liquid phase, which comprises the aliphatic halide (or phosphorous trihalide or both) and the product phosphonous dihalide. In effecting this separation, precaution should be taken to exclude molecular oxygen and water from the necessary physical operations; this is most easily done through the use of a dry-box filled with an inert gas such as carbon dioxide or nitrogen. Separation of the aliphatic halide (or phosphorous trihalide or both) from the phosphonous dihalide is easily effected by fractional distillation of the liquid.

To this point, the process of the invention has been described as a two-step process: in a first step, ternary complex and phosphorus are reacted to form binary complex and phosphorous trihalide, and in a second step, binary complex is reacted with aliphatic halide and phosphorous trihalide to form ternary complex and aliphatic phosphonous dihalide. We also have found that aliphatic phosphonous dihalides can be prepared by a single step process wherein the aliphatic halide, phosphorus and phosphorous trihalide are reacted in the presence of the ternary complex to form the phosphonous dihalide. The reaction of the aliphatic halide, phosphorous trihalide and phosphorus to form the aliphatic phosphonous dihalide proceeds, according to the equation:

$$3RX + 2P + PX_3 = 3RPX_2$$

wherein R and X have the respective meanings already assigned to these symbols hereinbefore.

The reaction of the aliphatic halide, phosphorus and phosphorous trihalide in the presence of the ternary complex is conducted in a manner quite similar to that used to conduct the reaction of the ternary complex with phosphorus, and the binary complex with the aliphatic halide and phosphorous trihalide. Thus, the aliphatic halide, phosphorous trihalide, phosphorus and ternary complex are all mixed together, the mixture is heated at a temperature within the range set out hereinbefore for conduct of the reaction of the ternary complex with phosphorus, in the absence of water and molecular oxygen, and the product aliphatic phosphonous dihalide is recovered from the resulting reaction mixture.

Again, it is desirable that the reaction be carried out in the presence of an inert diluent of the kind already described herein for use in the reaction of the ternary complex with phosphorus. Again, it is desirable that a mixture of the aliphatic halide and the phosphorous trihalide used as reactants also be used as the diluent, since this greatly aids in obtaining a pure product in a simple manner. In such cases, it is desirable because of the solubility characteristics of the materials involved, that the aliphatic halide comprise the major component of the diluent.

The three reactants may be employed in any proportions desired. However, it is preferred that at least the stoichiometric amount, relative to the amount of phosphorus charged, of each of the aliphatic halide and the phosphorous trihalide be used. Thus, it is preferred that at least 0.5 mole of the phosphorous trihalide and at least 1.5 moles of the aliphatic halide be employed per mole of phosphorus charged. (It must be understood that in some cases, less of each of these reactants, for example as little as 0.1 mole of phosphorous trihalide and 0.25 moles of aliphatic halide, per mole of phosphorus, may be employed to advantage in some cases.) Normally, it is preferable that both the phosphorous trihalide and the aliphatic halide be present in the reaction in substantial excess over the minimum amount required to react with the phosphorus. Thus in many cases it is desirable to employ as much as 10 moles of the phosphorous trihalide per mole of phosphorus and as much as 20 moles of aliphatic halide per mole of phosphorus. Usually, little additional advantage accrues in using more than about 5 moles of phosphorous trihalide and 10 moles of aliphatic halide per mole of phosphorus. It will be evident that these excesses of the phosphorous trihalide and the aliphatic halide are employed to provide not only the necessary amount of each of these compounds to react with the phosphorus but also to provide the desired diluent.

The permissible, and the preferable, reaction temperatures used are those set out hereinbefore in the description of the reaction of the ternary complex with phosphorus. Likewise, the permissible limits and the preferred ranges of the other process conditions, including pressure, mixing time and additional heating time, are those set out hereinbefore with respect to the conduct of the reaction between the ternary complex and the elemental phosphorus. As in the case of the reaction of the ternary complex and phosphorus, it is necessary in conducting the reaction of the aliphatic halide, phosphorous trihalide and phosphorus, that all water and molecular oxygen be excluded from the reaction zone, and in the course of other operations involved in obtaining the desired phosphonous dihalide product.

Surprisingly, we also have found that when the reaction of the phosphorus, aliphatic halide, and phosphorous trihalide is conducted in this single-stage manner, it is not necessary in all cases that the amount of ternary complex charged to the reaction mixture be the amount required by the stoichiometric relationships established by the equations already set out herein. Thus, while excellent yields of the phosphonous dihalide product are obtained by mixing ternary complex, phosphorus, phosphorous trihalide and aliphatic halide in about the molar ratios 3:2:1, good yields of the dihalide product normally are obtained when as little as about 0.1 mole of ternary complex per atom by weight of phosphorus is used under the same circumstances. The ternary complex thus appears to act as a catalyst in this single stage reaction. At least about 0.05 mole of ternary complex per mole of phosphorus are required for preparation of the phosphonous dihalide product at practical rates. Preferably, at least about 0.1 mole of ternary complex is used per atomic weight of phosphorus.

We have further discovered that in this single stage reaction system, the ternary complex may be formed in situ—that is, anhydrous aluminum trihalide is added to the reaction mixture of phosphorus, phosphorous trihalide and aliphatic halide in an amount sufficient to provide the desired amount of ternary complex, which forms in the reaction mixture according to the reaction:

$$AlX_3 + RX + PX_3 = [RPX_3]^+ \cdot [AlX_4]^-$$

wherein R and X have the respective meanings already assigned these letters. Thus, where the ternary complex is formed in situ, at least about 0.05, and preferably at least about 0.1 mole of anhydrous aluminum chloride per mole of phosphorus is added to the phosphorus-phosphorus trihalide-aliphatic halide reaction mixture, and the reaction is conducted as where the ternary complex is formed outside the reaction system and then added thereto.

The foregoing constitutes a detailed description of our discoveries, and the various aspects of the process which embodies those discoveries. The following examples illustrate particular applications of that process. It is to be understood that these examples are included only for the purpose of illustrations, and are not to be construed as limiting the invention in any way not recited in the claims.

EXAMPLE I 637 grams (1.5 moles) of the ternary complex of carbon tetrachloride, aluminum chloride and phosphorous trichloride was charged to a reactor in which was maintained a carbon dioxide atmosphere. The reactor was slowly heated and the contents agitated. White phosphorus was added, 1 to 2 grams at a time, over a period of about 1 hour, until a total of 31 grams (1.5 moles) had been added. The temperature of the mixture was held at from 75° C. to 100° C. for two and one-half hours after all of the phosphorus had been added. There was recovered by distillation 122 grams (0.89 mole) of phosphorous trichloride, representing an 89% conversion of the ternary complex to the binary complex of trichloromethylphosphonous dichloride with aluminum chloride. The reduced complex was a brownish-orange oily liquid, identified by elemental analysis.

EXAMPLE II 508 grams (1.19 moles) of the ternary complex of carbon tetrachloride, aluminum chloride and phosphorous trichloride was charged to a reactor in which was maintained a carbon dioxide atmosphere. 506 grams (3.67 moles) of phosphorous trichloride was added, and the agitated mixture was heated to about 40° C. 37 grams (1.19 moles) of white phosphorus then was added, ½ to 1 gram at a time, over a period of 20 minutes. The temperature of the mixture varied from about 50° C. to about 75° C. The mixture then was heated at about 75–80° C. for an additional 6½ hours. The mixture was then cooled, the majority of the phosphorous trichloride formed by the reaction removed by decantation, and the remaining material extracted with methylene chloride. The resulting methylene chloride solution was then distilled to remove the solvent, to give 256 grams of a product identified by elemental analysis as the binary complex of aluminum trichloride and trichloromethylphosphonous dichloride. Yield of the binary complex based on the ternary complex was thus 61%.

and the liquid decanted from the solid material. The liquid then was Claisen distilled to give a waxy, colorless solid product. Elemental analysis and infrared spectrum of the product identified it as trichloromethylphosphonous dichloride, melting at approximately 40° C. and boiling at 67° C. at 20 millimeters mercury pressure.

EXAMPLE IV 850 grams (2.0 moles) of the ternary complex of carbon tetrachloride, phosphorous trichloride and aluminum chloride and 1374 grams (10 moles) of phosphorous trichloride (as solvent) were charged to a reactor containing an atmosphere of nitrogen. This mixture was heated to 60° C. and with continuous stirring white phosphorus was added in 1 to 3 gram pieces over a period of 2.5 hours. (The phosphorus was anhydrous—any water present thereon had been removed washing the phosphorus with acetone and then with benzene and drying by blotting the phosphorus.) During addition of the phosphorus, the mixture was maintained at a temperature of about 70–75° C.; the constantly stirred mixture then was maintained at this temperature level for an additional 4.5 hours. The reaction mixture then was cooled to room temperature and 2194 grams (14.25 moles) of carbon tetrachloride was added. The constantly stirred mixture then was heated at a temperature of about 75° C. for 4.5 hours. The reactor then was transferred to a dry-box containing a nitrogen atmosphere and the liquid phase was decanted from the solid ternary complex formed in the course of the reaction. The complex then was rinsed with 600 grams of fresh carbon tetrachloride and the wash liquid was combined with the decanted liquid phase of the reaction mixture. The liquid then was distilled to remove the carbon tetrachloride and phosphorous trichloride present therein, and the residue was distilled to give 261.5 grams (1.18 moles) of trichloromethylphosphonous dichloride identified by elemental analysis and infrared spectrum. This represented a 59.2% yield of the dichloride, based on the amount of ternary complex originally charged.

EXAMPLE V

To demonstrate the feasibility of conducting the process of the invention in a continuous manner, recycling the ternary complex, aliphatic halide and phosphorous trihalide present in the final reaction mixture, a series of runs were made, the ternary complex, aliphatic halide and phosphorous trihalide recovered from the previous run being used as sources of these material in the later run. The reactants in all cases were (a) the ternary complex of carbon tetrachloride, aluminum chloride and phosphorus trichloride, (b) white phosphorus, (c) phosphorous trichloride and (d) carbon tetrachloride. All of these runs were performed in the manner set out in Example IV. The process conditions and results are set out in Table I.

Table I

| Run No. | Charge | | | Temperature (°C.) | Reaction time (hours) | Moles of $CCl_4$ added | Temperature (°C.) | Reaction time (hours) | Moles of $Cl_3CPCl_2$ product | Yield (percent, based on amount of ternary complex charged) |
|---|---|---|---|---|---|---|---|---|---|---|
| | Moles of ternary complex | Moles of phosphorus | Moles $PCl_3$ | | | | | | | |
| 1 | 2.0 | 1.43 | 10.00 | 60–75 | 7.0 | 13.84 | 75 | 5.0 | 1.01 | 50.8 |
| 2 | 2.0 | 1.39 | 10.00 | 60–75 | 6.92 | 14.25 | 75 | 4.66 | 1.18 | 59.2 |
| 3 | 2.0 | 1.39 | 10.00 | 63–74 | 5.92 | 14.25 | 75 | 6.5 | 1.18 | 59.0 |
| 4 | 2.0 | 1.39 | 10.00 | 59–78 | 11.85 | 14.25 | 75 | 9.9 | 1.18 | 59.0 |
| 5 | 2.0 | 1.39 | 10.00 | 60–76 | 3.27 | 14.25 | 75 | 8.0 | 1.14 | 56.8 |

EXAMPLE III 708 grams of the binary complex prepared according to Example II were mixed with 2194 grams of carbon tetrachloride and 1375 grams of phosphorous trichloride. The mixture was heated at approximately 75° C. for one hour and fifteen minutes. The mixture then was cooled Further experimentation shows that the yield of trichloromethylphosphonous dichloride actually is much higher, but that the particular technique used to recover the dichloride in these experiments introduces a systematic loss of the product. On a loss-free basis, the yields of the dichloride are believed to be about 85%.

EXAMPLE VI

To demonstrate the single-step aspect of the process of the invention, the following experiment was performed:

1 mole of the ternary complex of carbon tetrachloride, phosphorous trichloride and aluminum chloride was mixed with 1.7 moles of phosphorus trichloride and 4.0 moles of carbon tetrachloride. 0.67 mole of white phosphorus was added over a period of one hour to the stirred mixture maintained at a temperature of 75–80° C. The stirred mixture then was maintained at this temperature for an additional 5.75 hours. The mixture then was cooled, the liquid decanted, distilled to remove the carbon tetrachloride and phosphorous trichloride therein, and then was distilled to give a 36.1% yield, based upon the amount of elemental phosphorus charged, of trichloromethylphosphonous dichloride identified by its elemental analysis and infrared spectrum.

EXAMPLE VII

To demonstrate the use of the ternary complex as catalyst in the single-step aspect of the process of the invention, the following experiment was performed:

0.17 mole of the ternary complex of carbon tetrachloride, phosphorous trichloride and aluminum chloride was mixed with 1.35 moles of phosphorous trichloride and 3.96 moles of carbon tetrachloride. 1.2 moles of white phosphorus then was added to the heat (75–80° C.) stirred mixture over a period of about 1 hour and the mixture then was maintained at this temperature for an additional 17 hours. The resulting reaction mixture was worked up in the manner set out in Example IV to give the trichloromethylphosphonous dichloride as product.

EXAMPLE VIII

Butylphosphonous dichloride was prepared by the following procedure:

313 grams (0.86 mole) of the ternary complex of n-butyl chloride, phosphorus trichloride and aluminum chloride and 619 grams (4.5 moles) of phosphorus trichloride were charged to a reactor. The mixture was heated slowly, white phosphorus being added portionwise. At the end of about one hour, the mixture temperature was 60° C.; the mixture temperature was then maintained in the range of 60° C.–70° C. 20 grams (0.64 mole) of white phosphorus was added over a period of two hours and twenty minutes. One and one-half hours later, addition of n-butyl chloride was begun; 370 grams (4.0 moles) of n-butyl chloride were added over a period of about 10 minutes. The mixture was then kept at reaction temperature for an additional 18 hours. The product was worked up by the method set out in Example IV, n-butyl chloride being used as wash liquid, to give a product identified as n-butylphosphonous dichloride by elemental analysis.

As is shown at pages 51 et seq. of Kosolapoff, "Organophosphorus Compounds," Wiley (1950), the aliphatic phosphonous dihalies (therein termed halophosphines) prepared according to this invention are quite reactive and can be used to synthesize a variety of other compounds. Of particular interest are the alpha-haloalkyl phosphonous dihalides prepared according to the invention, since these can easily be converted to the corresponding alpha-haloalkyl phosphonic acids; certain of the amine salts of such alpha-haloalkyl-phosphonic acids have been found to impart outstanding extreme pressure and load carrying properties to lubricant compositions in which they are incorporated, to be oil-soluble and substantially non-corrosive and thus to be promising extreme pressure agents for lubricant compositions.

Thus, for example, the alpha-haloalkyl phosphonous dihalides can be carefully chlorinated by the method of Guichard, Berichte, 32, 1572 et seq. (1899) to form the corresponding tetrahalides, which then can be hydrolyzed to the corresponding alpha-haloalkylphosphonic acids by the mthod of Yakubovich, Ginsberg and Makarov, Doklady Akad. Nauk S. S. S. R., 71, 303–5 (1950).

The manner in which the amine salts of alpha-haloalkylphosphonic acids are prepared is set out in copending application Serial No. 604,619, filed August 17, 1956, which claims the said amine salts as novel compositions of matter. The utility of these amine salts as extreme pressure additives for lubricating compositions and the manner in which they are used for that purpose are set out in copending application Serial No. 604,618, filed August 17, 1956, which claims lubricating compositions containing the said amine salts as extreme pressure additives.

We claim as our invention:

1. A process for preparing an aliphatic phosphonous dihalide, which process comprises reacting a ternary complex of an aliphatic hydrocarbon halide, a phosphorous trihalide and an aluminum halide with elemental phosphorus, and reacting the resulting binary complex of an aliphatic hydrocarbon phosphonous dihalide and the aluminum halide with a phosphorous trihalide and an aliphatic hydrocarbon halide.

2. A process for preparing an aliphatic phosphonous dihalide, which process comprises reacting a ternary complex of an aliphatic hydrocarbon halide, a phosphorous trihalide and an aluminum halide with elemental phosphorus in the presence of a diluent comprising the said phosphorous trihalide, and reacting the resulting mixture with an hydrocarbon aliphatic halide.

3. A process according to claim 2 wherein the aliphatic hydrocarbon halide reacted with the ternary complex-elemental phosphorus reaction mixture is the same as the aliphatic hydrocarbon halide used in preparing the ternary complex.

4. A process for preparing an aliphatic phosphonous dihalide, which process comprises reacting an aliphatic hydrocarbon halide, a phosphorous trihalide and elemental phosphorus in the presence of a ternary complex of said aliphatic hydrocarbon halide, said phosphorous trihalide and an aluminum halide.

5. A process for preparing an aliphatic phosphonous dihalide, which process comprises reacting an aliphatic hydrocarbon halide, a phosphorous trihalide and elemental phosphorus in the presence of an aluminum halide.

6. A process for preparing a binary complex of an aliphatic phosphonous dihalide with an aluminum halide, said process comprising reacting a ternary complex of an aliphatic hydrocarbon halide, a phosphorous trihalide and an aluminum halide with elemental phosphorus.

7. A complex of an alpha-poly-halo-aliphatic hydrocarbon phosphonous dihalide and an aluminum halide, wherein the halogens are halogens other than fluorine.

8. A complex of an alpha-poly-haloalkyl phosphonous dihalide and an aluminum halide, wherein the halogens involved are halogens other than fluorine.

9. A process for preparing an aliphatic phosphonous dihalide, which process comprises reacting a complex of an aliphatic hydrocarbon phosphonous dihalide and an aluminum halide with a phosphorous trihalide and an aliphatic hydrocarbon halide.

No references cited.